P. A. ULRICH.
LAND MARKER.
APPLICATION FILED DEC. 28, 1909.
958,567.
Patented May 17, 1910.
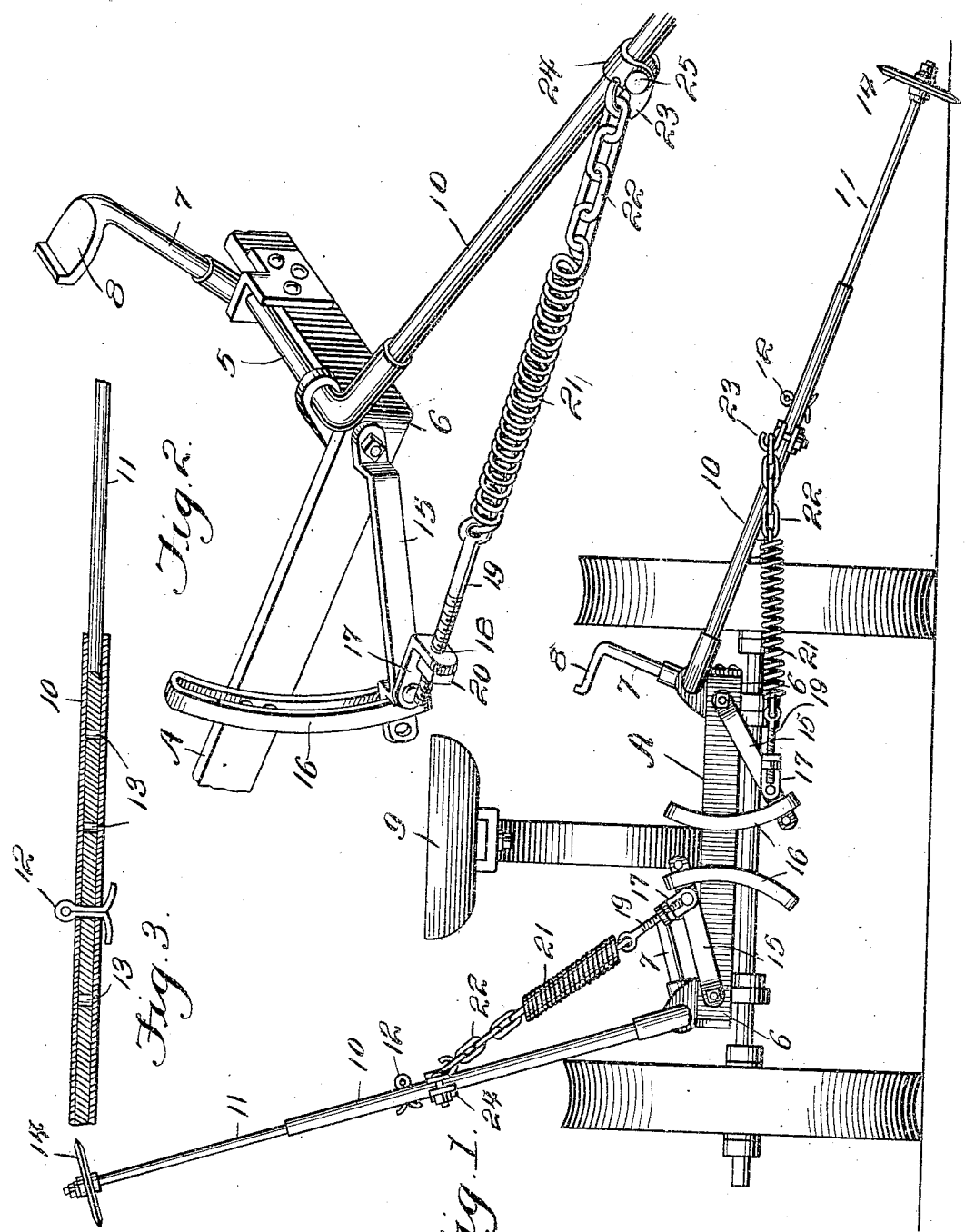

UNITED STATES PATENT OFFICE.

PETER A. ULRICH, OF DEER CREEK, ILLINOIS.

LAND-MARKER.

958,567. Specification of Letters Patent. Patented May 17, 1910.

Application filed December 28, 1909. Serial No. 535,282.

*To all whom it may concern:*

Be it known that I, PETER A. ULRICH, a citizen of the United States of America, residing at Deer Creek, in the county of Tazewell and State of Illinois, have invented new and useful Improvements in Land-Markers, of which the following is a specification.

This invention relates to markers or gages for corn planters and has for its objects to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a rear elevation, showing a frame of a corn planter equipped with the improved marking device. Fig. 2 is a perspective view, showing the operating mechanism of the improved marking device detached. Fig. 3 is a sectional detail view of a portion of the marker arm.

Corresponding parts in the several figures are denoted by like characters of reference.

The improved marking device includes a rock shaft 5 supported for oscillation in suitable bearings upon one of the side members of a planter frame, as shown in Fig. 1, or upon one of the arms of an L-shaped bracket, as shown in Fig. 2 of the drawings, where said bracket is shown at 6, said bracket being adapted to be bolted or otherwise secured upon one of the rear corners of the planter frame A. It is to be understood that the improved device includes two markers designed for the right and left hand corners of the frame, respectively. The rock shaft 5 is provided at its front end with an arm 7 having a foot piece or pedal 8 extending laterally to a convenient position with reference to the operator, whose seat 9 is supported in the usual manner upon the planter frame. The pedal-carrying arm 7 is disposed at what will be for convenience designated as the inner end of the rock shaft 5, being the end distant from the side of the planter frame; the outer end of the rock shaft has a tubular extension 10 forming an arm which is disposed radially with reference to the rock shaft and approximately at right angles to the arm 7. Fitted adjustably in the tubular arm 10 is a rod 11 which is capable of being secured at various adjustments by means of a cotter pin 12 engaging any one of a plurality of perforations 13 in the rod 11, said rod carrying at its outer end a gage wheel 14 which is mounted for rotation in any suitable, convenient and well known manner.

An arm or lever 15, which is pivotally mounted upon the rear side of the planter frame in a corresponding position upon the bracket 6, is guided at its free end in an arcuate keeper 16 suitably supported upon the planter frame or upon the side of the bracket 6. Pivotally supported upon the arm or lever 15 is an L-shaped bracket 17, the outwardly extending arm of which has an aperture 18 for the passage of an eye bolt 19 which is connected with said pivoted bracket by means of a nut 20. The eyebolt 19 is connected by a tension spring 21 with a chain 22, one of the links of which engages a hook 23 formed upon a clamp 24 which is adjustably mounted upon the tubular arm 10 by fastening means, such as a bolt 25.

The operation and advantages of this invention will be readily understood from the foregoing description taken in connection with the drawings hereto annexed by those skilled in the art to which it appertains.

One of the markers is mounted upon the planter frame adjacent to each side of said frame, the position being adjacent to the rear corners, and the said marking devices are made right and left handed, as will be seen by reference to Fig. 1. In Fig. 1 the right hand marker has been shown in ground-engaging position, while the left hand marker has been shown raised to a non-operative position; in the former case the pivoted arm or lever 15 is positioned adjacent to the lower end of the keeper 16, and the tension of the spring 21 is exerted to force the tubular arm downward, thus holding the gage wheel 14 in ground-engaging position, as will be seen. The operator by placing his foot upon the pedal 8 and pressing downward will oscillate the rock shaft 5, thus bringing the arm 10 to an elevated position, as indicated at the left hand side of Fig. 1. As the arm 10 ascends the spring 21 is strained until a point is passed at which the pivotal point of the bracket 17, the fulcrum of the lever 15 and the attaching point of the chain 22 to the hook 23 are in alinement with each other. This point having been passed, the tension of the spring will be exerted to swing the lever 15 in an upward direction and to hold the arm 10 with its related parts in an elevated position, as shown at the left hand side of Fig. 1. It is obvious that at each end of a row, when the machine is turned, the marker at one side will be raised from a ground-engaging position to a non-operative position, and that after the machine has been turned, the marking device previously out of commission will be lowered and put into active use.

The device, as will be seen, is simple in construction, and it is capable of being conveniently installed at small expense upon the frames of corn planters of ordinary construction. It will also be seen that adjustment may readily be made for the purpose of making the device applicable to machines adapted for planting the corn at various distances apart.

Having thus described the invention what is claimed as new, is:—

1. In a device of the character described, a rock shaft having a radially extending marker-carrying arm, a lever fulcrumed adjacent to said rock shaft, an arcuate keeper constituting a guide for said lever, and connecting means between said lever and the marker-carrying arm, said connecting means including a tension spring.

2. In a device of the character described, a rock shaft having a radially extending marker-carrying arm, a lever fulcrumed adjacent to the rock shaft, a keeper constituting a guide for said lever, an L-shaped bracket pivoted upon the lever, and connecting means including a tension spring between said L-shaped bracket and the marker-carrying arm.

3. In a device of the character described, a rock shaft having a radially extending marker-carrying arm, a lever fulcrumed adjacent to one end of the rock shaft, a keeper constituting a guide for said lever, an L-shaped bracket pivoted upon the lever, an eye bolt connected adjustably with said bracket, a tension spring connected with the eye bolt, a clamp secured upon the marker-carrying arm and having a hook, and a chain connecting said hook with the tension spring.

In testimony whereof I affix my signature in presence of two witnesses.

PETER A. ULRICH.

Witnesses:
W. L. PENNIMAN,
J. A. DANFORTH.